Figure 14:
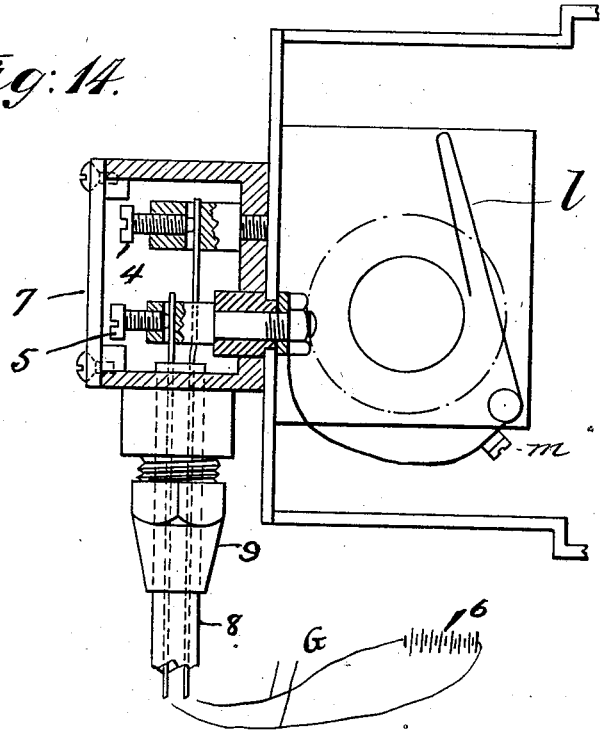

No. 701,651. Patented June 3, 1902.
T. F. & T. S. WALKER.
ELECTRICAL SHIP'S LOG APPARATUS.
(Application filed Sept. 9, 1901.)
(No Model.) 7 Sheets—Sheet 1.
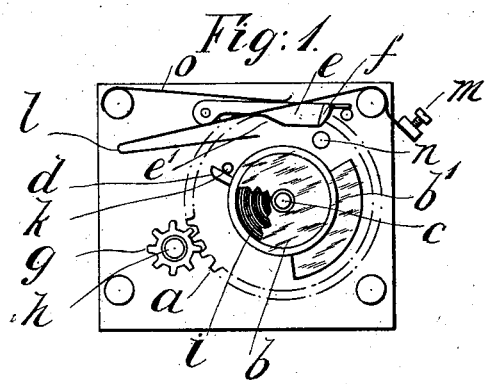
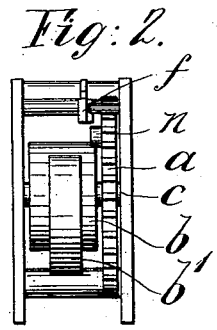
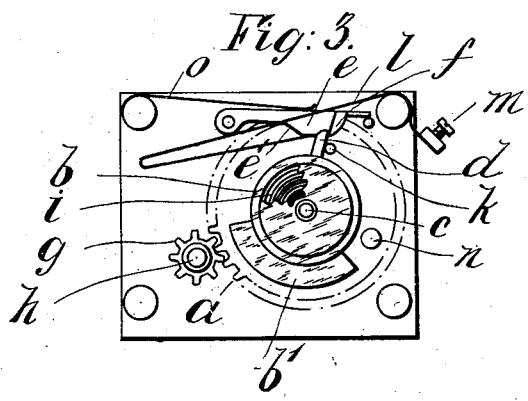
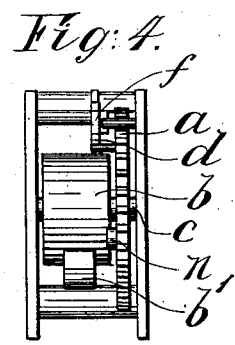
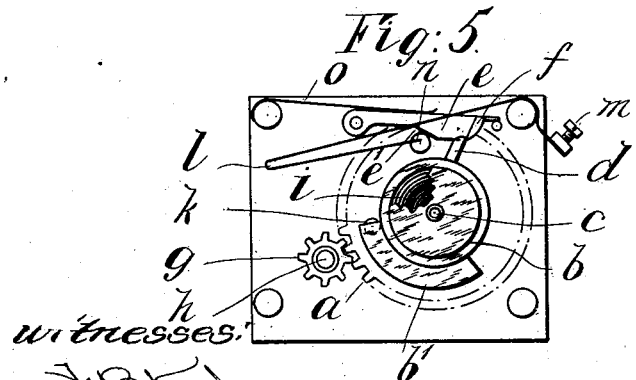
Witnesses:
Inventors
Thomas F. Walker
Thomas S. Walker
By James L. Norris
Atty

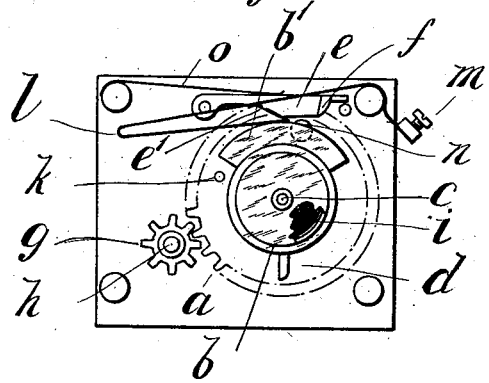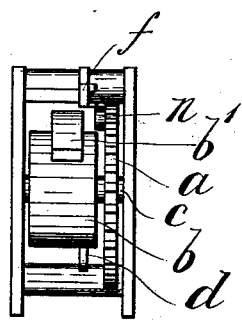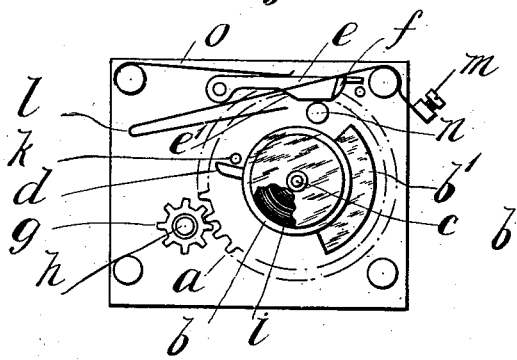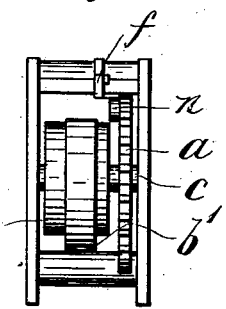

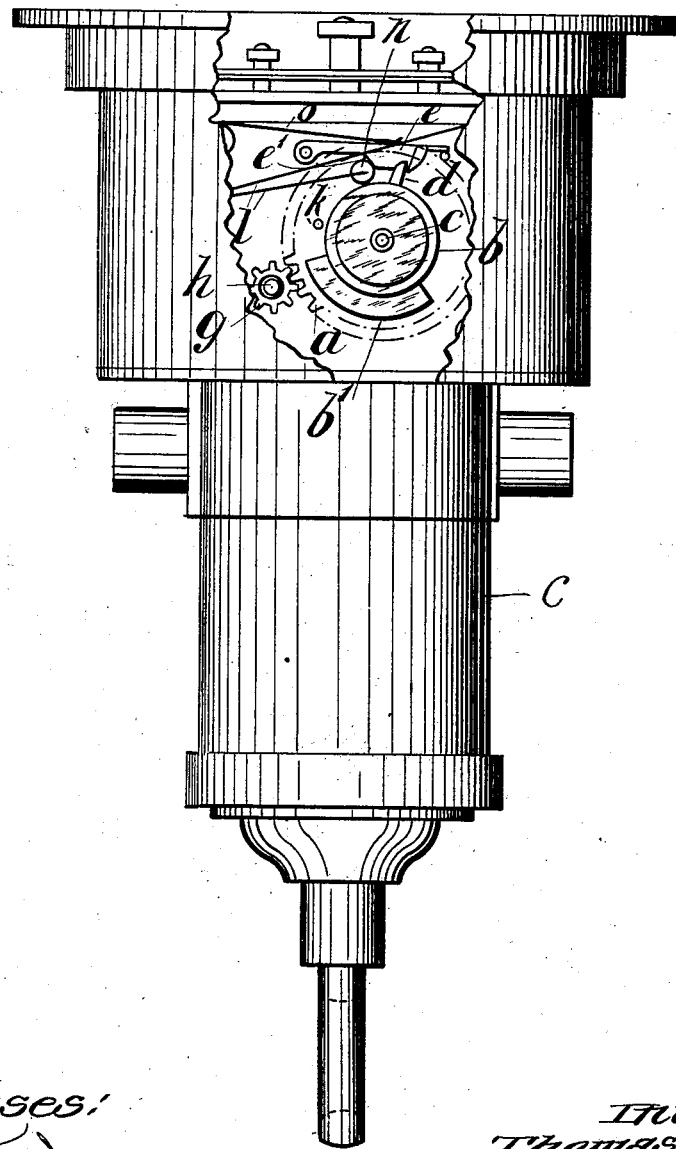

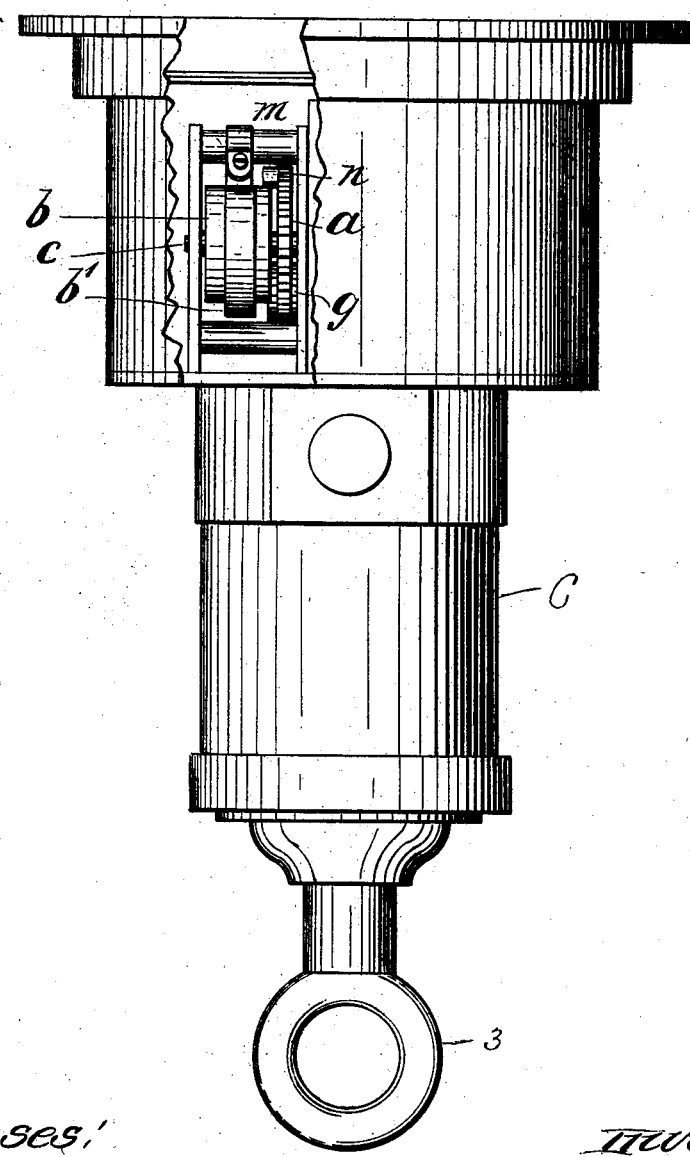

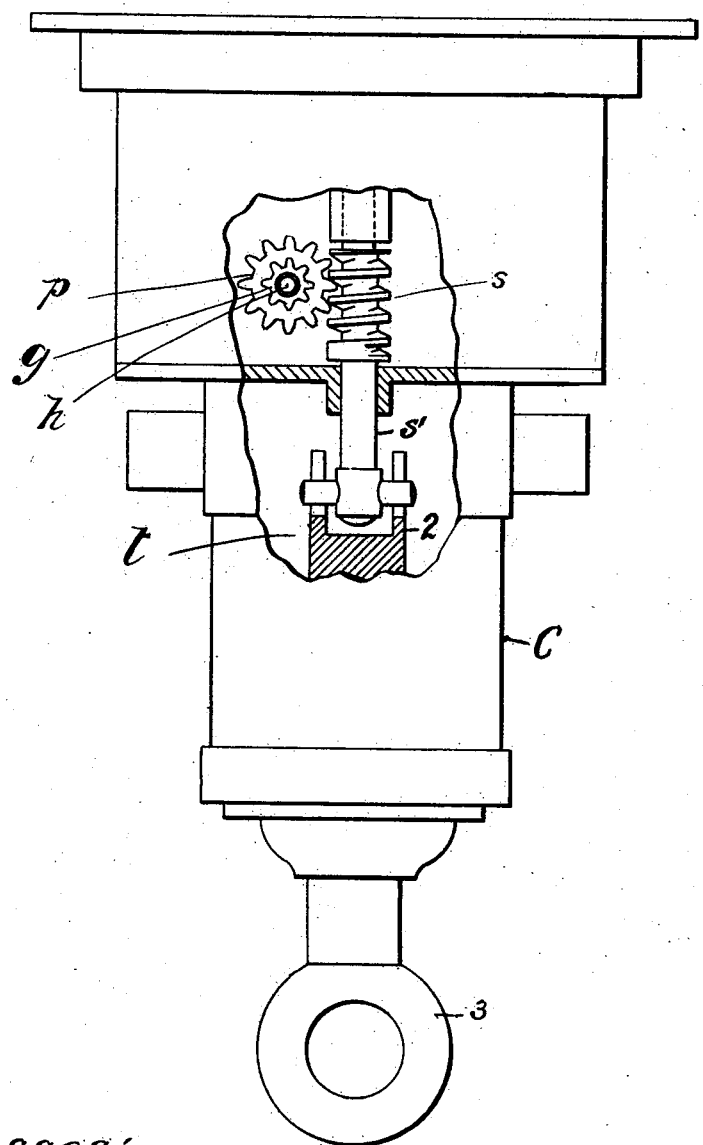

No. 701,651. Patented June 3, 1902.
T. F. & T. S. WALKER.
ELECTRICAL SHIP'S LOG APPARATUS.
(Application filed Sept. 9, 1901.)
(No Model.) 7 Sheets—Sheet 6.

Witnesses:
N. L. Bryan
C. D. Kesler

Inventors
Thomas F. Walker
Thomas S. Walker
By James L. Norris
Atty

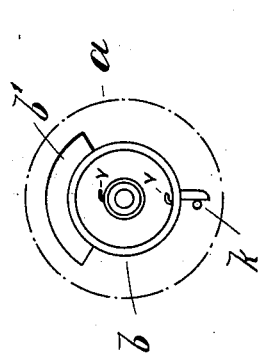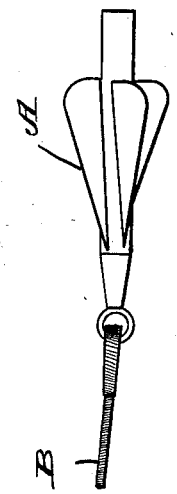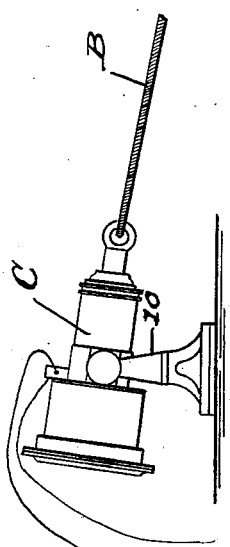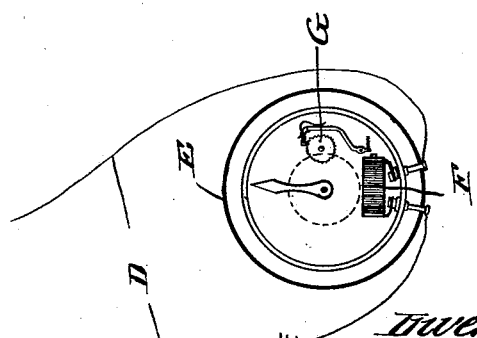

UNITED STATES PATENT OFFICE.

THOMAS FERDINAND WALKER AND THOMAS SYDNEY WALKER, OF BIRMINGHAM, ENGLAND.

ELECTRICAL SHIP'S-LOG APPARATUS.

SPECIFICATION forming part of Letters Patent No. 701,651, dated June 3, 1902.

Application filed September 9, 1901. Serial No. 74,855. (No model.)

*To all whom it may concern:*

Be it known that we, THOMAS FERDINAND WALKER and THOMAS SYDNEY WALKER, both of the firm of Thomas Walker & Son, engineers, subjects of the King of Great Britain, residing at 58 Oxford street, Birmingham, in the county of Warwick, England, have invented certain new and useful Improvements in or Relating to Electrical Ship-Log Apparatus, (for which application has been made in Great Britain, No. 4,005, dated February 25, 1901,) of which the following is a specification.

This invention relates to ship-log apparatus in which electrical energy is employed in the transmission of the motions of a rotator in the water to mechanism on board ship with the aid of wheelwork and gearing employed in reducing those motions, so as to indicate measurements of distance through which the vessel towing the rotator has run. It has been found in practice to be detrimental to the prolonged efficiency of log-registering apparatus of this class (subject, as the rotative parts are, to sudden and spasmodic or variable speeds of oscillations) to employ electrical contacts of any great duration, because for one reason disturbance of continuity of contact, or, as it is called, "chattering," and a plurality of impulses, when only one is desirable, may result. To guard against this danger, we have devised mechanism by which any such dangerous length of contact may be avoided and a very limited extent of contact insured, which contact shall be, furthermore, uniform in point of time as well as in actual distance traversed relatively by the parts while in their rubbing contact. This period of rubbing contact we make practically independent of any lagging, stopping, or "racing" that may cause intermittent rotation of the motor portion of the mechanism, and we thereby nullify the ill effects of such irregularity arising from variations of torsional strains and movements between the "rotator" and the parts impelled to rotate by it or from other cause. In order to effect this result, we have designed mechanism in which a toothed wheel, actuated by substantially usual gearing, revolves in harmony with the primary spindle, whose rotations are brought about by the rotator in the water. On the axis of this toothed wheel is mounted a barrel, which is loose on said axis, except by a connection with a spring coiled therein. The end of this coiled spring (opposite to the end affixed to the axis revolving within this barrel) is connected to the barrel, so as to give to the barrel a constant tendency to rotate sympathetically with the said axis, and a partial coiling of the spring on said axis increases that tendency. A stud on the periphery of the barrel, contacting with a pin projecting from the face of the toothed wheel referred to, limits the uncoiling of the spring and the extent of movement of the barrel relatively to the axis, while the spring-pressure keeps the stud against the pin and the barrel and toothed wheel rotate in unison until, as will be explained, the motion of the barrel is temporarily arrested. This stud projects beyond this pin, and in its rotation with the barrel and wheel its path brings it in contact with a projection from a centered detent or latch, and by this projection from the latch the stud is withheld from following in its path the rotation of the toothed wheel and of the shorter pin. This withholding of the stud also holds the barrel from rotation, and, furthermore, such stoppage and the continuance of rotation of the axis causes a further winding up of the barrel-spring. A spring affixed in rear of the latch keeps it normally in its position to obstruct the stud in its path of rotation. Around a portion of the periphery of the barrel is applied a projecting block, which serves as a circuit-closer when in contact with a contact-piece fixed so as to come into electrical rubbing contact with said block as the barrel-carrying block rotates past said contact-piece. This contact-piece is herein shown as a spring, which is insulated, while by a wire attached to its terminal it is electrically connected to one pole of a battery, the other pole of which is connected by another wire to the framework of the instrument and by continuity of electrical conductivity to the barrel and the circuit-closer block mounted thereon, thereby constituting the circuit-closer and the insulated spring two free ends of an electric circuit. A second pin projects from the face of the toothed wheel referred to, which pin in in the rotation of said wheel comes once in each complete revolution in contact with an incline on the under side of the latch or detent, and in doing so lifts the detent against the influence of its depressing-spring, and in lifting the detent and its projection referred to releases the barrel-stud and barrel and its spring, until then temporarily withheld from participation in the continuous rotation of the axis and its toothed wheel. The barrel thus released flies round on its axis, causing its attachment—the circuit-closer—to effect a short rubbing contact with the insulated spring and during that short contact to close the electric circuit.

Our invention embraces a usual rotator, caused to rotate by the pressure of the water, means of conveyance of such rotation to a primary spindle actuating a train of wheelwork of substantially usual or convenient kind, (such primary spindle rotating continuously, although possibly intermittently as regards speed,) an axis on which is mounted a toothed wheel actuated by the primary spindle and on which axis is mounted loosely a barrel, a spring within said barrel, connected at one end thereto and at the other end affixed to the axis rotating within it, a stud on the periphery of the barrel, a corresponding stud on the toothed wheel to limit extent of relative movement of barrel and axes, a stud for releasing the barrel-stud from the detent, a detent and detent-catch, a circuit-closer mounted on the barrel, an insulated spring-contact arranged in the path of rotation of the circuit-closer, a source of electrical energy, as a battery, conductors of electricity and mechanism for indicating the movements of the register and of the contacting parts, so as to indicate thereby the progress of the vessel expressed in measures of length, as by means for transmitting the electric impulses through the medium of an electromagnet working a make-and-break device with ratchet and pawl or any other well-known means by which wheelwork can be moved by push-and-pull action, a barrel-spring coiled therein, an axis on which said barrel is loosely mounted and a toothed wheel is affixed, a stud on the barrel and a stop or stops on the toothed wheel, a detent and detent-spring cooperating with said stud and pins, a circuit-closer combined with said barrel, a spring contact-piece and means for conveying mechanical rotary motion to said axis and means for transmitting electrical impulses to registering, indicating, or indicating and annunciating apparatus in any convenient part or parts of the circuit on the ship, the closing device so operating that the electric circuit is closed for only a limited and constant period not variable with variations of speed of rotation of the motor and so that the closing takes place after the beginning of the flight of the barrel carrying the circuit-closer upon disengagement from the detent and before the end of that flight by contact of the barrel-stop with the stop on the toothed wheel, whereby the length and duration of flow of the electric energy is made entirely independent of the acceleration or retardation of the motion of the motor mechanism and is made reliably constant at all variations of speed of the motor, and, further, the duration of contact is rendered capable of regulation by adjustment of the tension given to the spring in its normal position of rest within the barrel.

Figure 15:
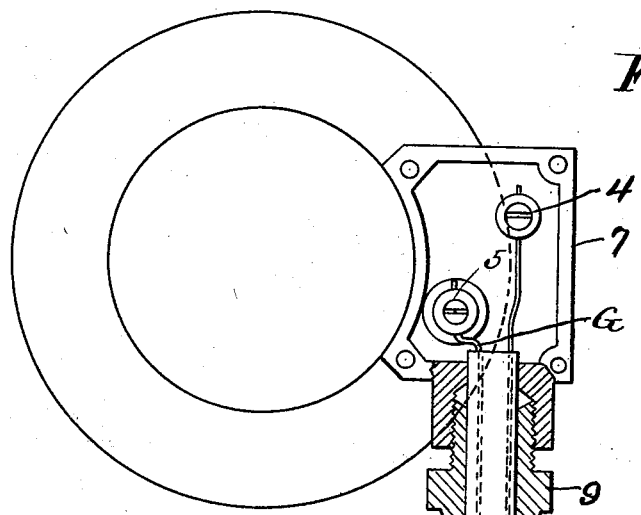

Figure 1 is a front view of apparatus constructed according to our invention, the various parts being shown in a position they assume when at rest. Fig. 2 is an edge view of the parts shown by Fig. 1. Fig. 3 is a similar view to Fig. 1, but showing the parts in the position they assume when the projecting stud on the periphery of the spring-barrel is arrested by the detent. Fig. 4 is an edge view of Fig. 3. Fig. 5 is a similar view to Figs. 1 and 3, but showing the parts in the position they assume when the stud on the large toothed wheel is about to lift the detent, and by that lifting allowing the contact-piece on the spring-barrel to complete an electrical circuit through the circuit-closer. Fig. 6 is an edge view of Fig. 5. Fig. 7 is a similar view to Figs. 1, 3, and 5, with parts rotated so that the detent is lifted, the spring-barrel has been released, and the contact-piece is in the act of making contact with the circuit-closer. Fig. 8 is an edge view of Fig. 7. Fig. 9 is a similar view to Figs. 1, 3, 5, and 7, showing the parts in a higher position they assume in the cycle of operations—namely, with the detent lifted, the spring-barrel released, it having made contact with the circuit-closer, and having been brought to rest by means of a stop on the large toothed wheel and a projecting stud on the periphery of the spring-barrel. Fig. 10 is an edge view of Fig. 9. Fig. 11 is a plan view of a log-register case fitted, the register-case being broken away in order to show a front view of parts of the apparatus applied therein. Fig. 12 is a log-register case, such as shown in Fig. 11, this case also being broken away to show an edge view of internal parts. Fig. 13 is a side elevation of the register-case, partly broken away to show the wheelwork-actuating pinion. Fig. 14 is a side view, partly in section, of the terminal box and terminals attached to the log-register case. Fig. 15 is a plan of Fig. 14, partly in section. Fig. 16 is a plan of the barrel, showing the hooks for connecting the spring thereto and to the axle; and Fig. 17 is a view showing the rotator, log, and a register.

We employ a rotator A of the usual description, which is caused to rotate by the water, and its rotations are transmitted by a flexible connection B to wheelwork of substantially usual description C, by which mechanically these motions are indicated by usual pointers moving relatively to dials bearing ordinary indications of distance— such as one mile, one hundred miles, and one thousand miles—(dials with subsidiary divisions) and from the primary spindle or any convenient part of this registering wheelwork we transmit the rotatory motion through a pinion $g$ to a toothed wheel $a$, on which is mounted a barrel $b$, containing a coiled spring $i$, said spring being connected at its opposite ends to the spindle $c$ of the toothed wheel $a$ and to the barrel $b$. Projecting from the face of the toothed wheel is a stud $k$, and from the periphery of the barrel is another stud $d$. These two studs $k$ and $d$, the spring having been sufficiently wound up by rotation of the wheel $a$ and barrel $b$ relatively to each other, are put into engagement, whereby relative rotation of the barrel $b$ independently of the wheel $a$ and its axle $c$ is limited to less than one rotation. On the periphery of the drum or barrel $b$ is mounted an electrical contact-piece $b'$, which contacts with a suitable elastic circuit-closer or circuit-closers $l$, attached to a terminal or terminals $m$, by which the electric circuit D is completed and the electrical current conveyed to a point or points where indications of the movements of the rotator through the mechanism are shown on other dials by pointers whose motions are brought about by such transmitted electrical energy.

The toothed wheel $a$ and the barrel $b$, mounted on the same spindle $c$, normally rotate together under the influence of the mechanical connection with the first spindle or intermediate rotation-transmitting parts, as stated; but at a prearranged point the projecting stud $d$ on the barrel $b$ comes in contact with a projection $f$ from a hinged lever or detent-lever $e$, so centered and adjusted that the contacting parts stay the rotatory progress of the barrel $b$ and set up a relative movement between the barrel $b$ and its connected wheel $a$ and axle $c$, causing the spring $i$ to be further wound up, until in the rotation of the toothed wheel $a$ another stud $n$, projecting from such wheel comes against an incline part $e'$ on the detent-lever and trips the engaged parts thereof and of the barrel $b$, whereupon the released barrel $b$ flies around a portion of a rotation, giving a rapid and uniform contact between the electrical contacting parts $b'$, $l$, and $m$, as described, and shown in Figs. 7 and 8, thereby closing the electric circuit and transmitting an electric impulse to a registering apparatus E in any suitable location on the line of the circuit, the wheelwork of which registering apparatus is actuated by the transmitted electric impulse through the medium of an electromagnet F, working a make-and-break action with ratchet and pawl G or any of the well-known methods by which wheelwork is moved by an alternating push-and-pull movement. The duration of contact is therefore reliably constant at all speeds and is regulatable by the amount of tension of the spring inside the barrel $b$, combined with the extent of the arc of the rubbing surface of the part $b'$. A spring $o$ engages the detent and locks the parts to their work. The coil-spring in the barrel keeps the projection $d$ in contact with the stud or pin $k$. To vary the spring tension, the barrel can be lifted away from the toothed wheel until $d$ is able to pass over $k$. Then by revolving the barrel relatively to the toothed wheel $a$ complete revolution either way, as required, and again letting the barrel fall back into position for $d$ to contact against $k$ the tension of the spring will be weakened or strengthened, according to the direction in which the barrel has been revolved. The primary spindle by dog and carrier connections rotates a primary worm or screw $s$, in which the worm-wheel $p$ is geared. The worm-wheel $p$ is attached to the axis $h$, on which the pinion $g$ is mounted.

In Fig. 13, C is the casing, in which is arranged the wheelwork-actuating pinion $p$, the latter engaging with the worm or screw $s$ on the spindle $s'$. The reference-numeral 2 denotes a coupling for connecting the spindle $s'$ to the flexible connection B. The coupling 2 is arranged within and projects from the casing C and is provided with an eye or ring 3, to which the flexible connection B is secured.

In Fig. 14, 4 5 denote the binding-posts for the wires forming the circuit G, and 6 denotes a battery or source of electrical supply. The reference-numeral 7 denotes the terminal-box, in which are arranged the binding-posts, and is, as shown, attached to the casing C. The wires of the circuit G extend through a sleeve 8, connected by the gland 9 to the box 7.

In Fig. 17 the numeral 10 denotes a standard for supporting the casing C.

Having now particularly described and ascertained the nature of our said invention and in what manner the same is to be performed, we declare that what we claim is—

1. In a ship's log, the combination with a train of wheelwork, a rotator and connections between the wheelwork and rotator, of an intermittently-operating circuit-closer, a contact-piece coöperating therewith, means operated by the wheelwork for rotating the said circuit-closer, a detent, a spring engaging therewith, a toothed wheel, a stop carried by said means and pins on the said wheel coöperating with the said detent, a register mechanism, and means for conveying electrical impulses to said mechanism.

2. In a ship's log; a train of wheelwork ending in a primary spindle and tooth-wheel, a rotator to actuate said train, a spring-containing barrel, a contact circuit-closer mounted on said barrel, a spring connecting said primary spindle and barrel, means on said tooth-wheel restricting the relative movement of barrel and tooth-wheel, means for adjusting the tension of said spring, a detent device coöperating with said spring-impelled barrel and means for conveying to and from the ends of a circuit and through said circuit-closer impulses of electrical energy.

3. In a ship's log; a register actuated by impulses of electrical energy, an electric circuit, an insulated contact-piece forming one terminal pole of the circuit, an intermittently-rotating circuit-closer, a terminal pole for the opposite end of the circuit electrically connected to said circuit-closer, a barrel carrying said closer, a spindle revolving within said barrel, a coiled spring connected by its opposite ends to the said barrel and spindle, a toothed member of train of motive wheelwork and means for alternately restraining and permitting the rotation of said spring-impelled barrel in coöperation with a detent.

4. An electric circuit, an insulated spring contact-piece, a contact-closer, a spring-impelled barrel carrying said closer, an axis therefor, a gear-wheel and train of impelling mechanism, means limitary of the relative rotation of barrel and gear-wheel, and detent devices for successively restraining revolution of the barrel and circuit-closer and permitting of rapid rotatory flight, substantially as set forth.

5. An open electric circuit, an insulated spring contact-piece forming one pole of the circuit, a source of electrical energy in said circuit and mechanical motive mechanism in electrical connection with the opposite pole of the circuit, a rotative intermittently-contacting circuit-closer, an axis common to the barrel and to the terminal member of a motive train of rotative mechanism and a spring connecting the barrel and terminal member referred to in combination with a detent device and stops on the barrel and terminal member of the motive train.

6. In a ship's log, a circuit-closer periodically rotating in unison with a member of a train of wheelwork, a contact-piece coöperating therewith, a spring, a barrel and a motor-axis to which opposite ends of the spring are connected, said barrel carrying said circuit-closer, a detent, a spring engaging the same, a stop on said barrel, a toothed wheel, a pin on said wheel, and means for conveying electrical impulses to a register mechanism.

7. In an electrical ship-log mechanism, a continuously-rotating member, an intermittently-operating member, a spring connecting the two members together and operated by the continuously-rotating member for suitably operating the intermittently-operating member, a circuit-closer fixed to the said intermittently-operating member, a contact coöperating with said closer for opening and closing an electrical circuit, and detent devices for successively restraining the operation of the intermittently-operating circuit-closer and permitting the rapid rotatory flight thereof.

In testimony whereof we have hereunto set our hands in presence of two subscribing witnesses.

THOMAS FERDINAND WALKER.
THOMAS SYDNEY WALKER.

Witnesses:
  HUME CHANCELLOR PINSENT,
  JOHN EDWARD WILLMOTT.